United States Patent [19]
Pistor et al.

[11] 3,864,454
[45] Feb. 4, 1975

[54] PROCESS FOR THE PRODUCTION OF ALKALI PERCARBONATE

[75] Inventors: Horst Pistor, Rheinfelden, Germany; Edmund Simmersbach, deceased, late of Reinfelden, Germany; by Ingeborg Mohler, heiress, Denzlingen, Germany; Artur Schaller, Rheinfelden, Germany; Gerd Knippschild, Wehr, Germany

[73] Assignee: Deutsche Gold-und Silber-Scheiceanstalt vormals Rossler, Postfach, Germany

[22] Filed: May 30, 1973

[21] Appl. No.: 365,249

[30] Foreign Application Priority Data
June 2, 1972  Germany............................ 2227014

[52] U.S. Cl............................................. 423/415
[51] Int. Cl............................................. C01b 15/10
[58] Field of Search................. 423/415, 415 P, 419

[56] References Cited
UNITED STATES PATENTS
1,950,320  3/1934  Muller............................ 423/415 P

FOREIGN PATENTS OR APPLICATIONS
1,198,317  12/1959  France............................ 423/415 P

*Primary Examiner*—Earl C. Thomas
*Attorney, Agent, or Firm*—Cushman, Darby & Cushman

[57] ABSTRACT

Alkali percarbonates are produced by spraying solid alkali carbonate with aqueous hydrogen peroxide at 35° to 60° C. and the alkali percarbonate formed following the hydrogen peroxide addition is either held for less than 30 minutes at about 40° to 60° C. or for longer than 30 minutes at 30° to 40° C. in a thin layer and then is dried at 20° to 90° C. either in pure carbon dioxide or an air stream containing carbon dioxide.

9 Claims, No Drawings

PROCESS FOR THE PRODUCTION OF ALKALI PERCARBONATE

It is known to prepare sodium peroxohydrate (sodium percarbonate) either by reaction of aqueous sodium carbonate solution with aqueous hydrogen peroxide solution and lessen the solubility of the percarbonate formed by addition of inert salts such as sodium chloride or else from the outset to use sodium carbonate (Zumbrunn German Offenlegungsschrift No. 1,667,801).

Also, there has been proposed the production of the percarbonate by spraying sodium carbonate with aqueous hydrogen peroxide solution (Oesterreichische German Pat. No. 610,611).

For this purpose hydrogen peroxide concentrations of 30 to 90 weight % are employed. Since lower reaction temperatures such as room temperature or temperatures up to 40° C. lead to hydration and therewith the loss of stability of the percarbonate, sodium percarbonate has also been produced in a fluidized bed process at higher temperatures of 55° to 65° or 70° C., namely by changing aqueous hydrogen peroxide to fluidized dry sodium carbonate (Williams German Offenlegungsschrift No. 2,133,566).

It must be added that several of the processes mentioned generally can be carried out only with specially purified soda solution.

The known processes accordingly operate either with foreign salts or with special techniques in order to obtain satisfactory yields and stability in storage.

It has now been found that alkali percarbonates, e.g., sodium percarbonate and potassium percarbonate, can be produced in an industrially simple manner by spraying a solid alkali carbonate, e.g., sodium carbonate or potassium carbonate, with aqueous hydrogen peroxide solution at a temperature of 35° to 60° C. if the alkali percarbonate formed following the addition of the hydrogen peroxide is either held for less than 30 minutes at 40° to 60° C. or longer than 30 minutes at 30° to 40° C. in a thin layer and then is dried at 20° to 90° C. either with pure carbon dioxide or with a stream of air containing carbon dioxide.

By "less than 30 minutes" is meant a time of 10 minutes and upwards and by "longer than 30 minutes" is meant a time up to 110 minutes. For the boundary value "30 minutes" both temperature ranges apply. Naturally it is possible in certain cases to carry out the heat treatment below 30 minutes and below 40° C., likewise the treatment can be carried out for longer than 30 minutes at up to 45° C., for large scale processes, however, the named times and temperatures are more favorable.

The carbon dioxide content of the drying air is between 0.05 to 2 volume %, preferably between 0.2 and 1 volume %. Obviously, the carbon dioxide content can be increased up to 100% and the air content reduced accordingly.

An alkali percarbonate recovered in this manner, preferably sodium percarbonate, accumulates in an $H_2O_2$ yield of from 80 to over 90% and has an active oxygen content of 14.5 to 15.1 % and a storage stability (thermostatically held for 16 hours at 65° C.) of 95 to 96%.

As alkali carbonates there are used soda and potassium carbonate. Carbonates with a particle size between 0.1 and 0.5 and a highest content of water of crystallization of 10 moles are preferred.

While hydrogen peroxide solutions of concentrations of 35 to 60 weight % or 30 to 90 weight % may be used, said solutions preferably are used as at least 70 weight % aqueous solutions, more preferably as an 80% solution. The hydrogen peroxide solution can be as high as a 90% solution.

Alkali carbonate and hydrogen peroxide (calculated as 100% hydrogen peroxide) are present in the end product in the molar ration of 1:1.5. They are added in the correspondingly equivalent proportions, in a given case hydrogen peroxide can be added in excess up to 20 weight %.

Both the production of the percarbonate and the heat treatment can take place in the same reactor. Suitable apparatus includes those in which the percarbonate accumulates in thin layers and is retained such as in revolving drums, granulating discs, fluidized bed apparatus.

The drying of the percarbonate can also take place with the stated media at room temperature; the necessary drying times for this, however, are uninteresting industrially. On the contrary, as previously mentioned, if the drying is carried out at higher temperatures in the presence of a small amount of carbon dioxide, preferably 0.2 to 1 volume % in an airstream, there is no loss of active oxygen and the product is stable. As drying apparatus there can be used the usual apparatus such as fluidized bed and drying is preferably at 65° C.

The industrial advantage of the process of the invention is in the short time required for production, as well as the simplicity of the process, since the usual apparatus can be employed. Additionally, the product obtained is free of sodium chloride and is not corrosive. It has a high active oxygen content and is very stable in storage. Moreover, it dissolves very quickly.

Unless otherwise indicated all parts and percentages are by weight. The invention will be further explained in the following Examples.

EXAMPLE 1

In a slightly upwardly inclined revolving drum of stainless steel 25 cm long and 28 cm in diameter, there was rotated at 36–40 revolutions per minute (rpm) 4,000 grams of anhydrous sodium carbonate having a particle size between 0.1 mm. and 0.5 mm. There was sprayed on the moving material to be reacted in the rotating drum 2.56 kilograms of a 78.9% aqueous hydogen peroxide solution from a completely conical nozzle having a bore of 0.2 mm. at a fluid pressure of 4 atmospheres absolute within 111 minutes. The aqueous hydrogen peroxide solution contained 2.5 weight % of magnesium chloride hexahydrate as a stabilizer. During the spraying process, the temperature in the drum was held at 40° C. After the addition of the hydrogen peroxide the reaction product was subjected to an aging process for 60 minutes at 40° C., i.e., a heat treatment, and subsequently dried in a fluidized bed with air containing 1.0 volume % of carbon dioxide at 55° C.

Yield 5,900 grams of sodium carbonate peroxohydrate containing 14.9 % active oxygen, i.e., 100% yield based on the soda and 92.8% yield based on the hydrogen peroxide.

A product was obtained which only lost 4% active oxygen when held at a temperature of 65° C. for over 16 hours in a drying cabinet.

EXAMPLE 2

The process of Example 1 was repeated but the aging time was shortened to 40 minutes. The product contained 14.8% active oxygen. The testing of the storage stability showed a loss of 5% of the active oxygen.

EXAMPLE 3

The procedure was the same as in Example 1 except the aging was at a temperature of 32° C. The aging time was 80 minutes. The product contained 15.1% of active oxygen. The testing of the storage stability showed a 4% loss of active oxygen.

EXAMPLE 4

The procedure was the same as in Example 1 except the aging was at a temperature of 60° C. The aging time was 25 minutes. Drying was with air containing 1 volume % of carbon dioxide at 75° C. The product had 14.7% active oxygen and in the testing of the thermostability (16 hours at 65° C. in the drying cabinet) lost 5% of its active oxygen.

What is claimed is:

1. A process for producing alkali metal percarbonate comprising spraying solid alkali metal carbonate with aqueous hydrogen peroxide solution having a concentration of 35 to 90% and holding the alkali metal percarbonate at either (1) a time of between about 10 minutes and about 30 minutes at about 40° to 60°C. or (2) at a time between about 30 minutes and 110 minutes at 30° to 40°C. in a thin layer and then drying at 20° to 90°C. in a carbon dioxide containing gas which is either pure carbon dioxide or a mixture of carbon dioxide with air.

2. A process according to claim 1, wherein the alkali metal percarbonate is sodium percarbonate and the alkali metal carbonate is sodium carbonate.

3. A process according to claim 1, wherein the carbon dioxide containing gas is air containing 0.05 to 2 volume % of carbon dioxide.

4. A process according to claim 3, wherein the carbon dioxide containing gas is air containing 0.2 to 1 volume % of carbon dioxide, the alkali metal percarbonate is sodium percarbonate and the alkali metal carbonate is sodium carbonate.

5. A process according to claim 4, wherein the drying is carried out at 65° C.

6. A process according to claim 3, wherein the aqueous hydrogen peroxide contains at least 70% hydrogen peroxide.

7. A process according to claim 1 wherein the aqueous hydrogen peroxide solution has a concentration of 35 to 60%.

8. A process according to claim 1 wherein the carbon dioxide content of the gas is 0.05 to 100%.

9. A process according to claim 8 wherein the hydrogen peroxide concentration is at least 70%.

* * * * *